(No Model.)
R. H. ST. JOHN.
RAILWAY CROSSING.
No. 430,760. Patented June 24, 1890.
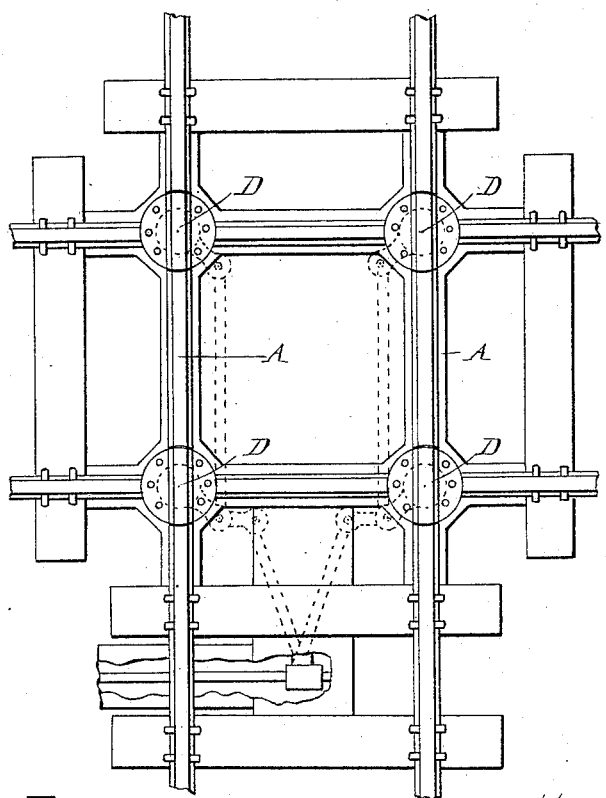
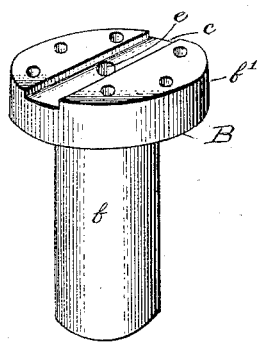
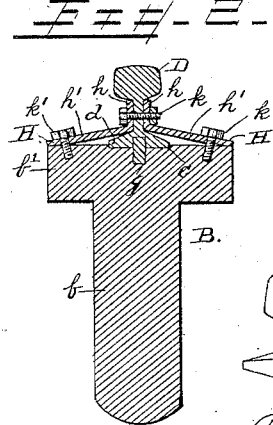
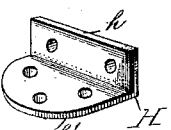
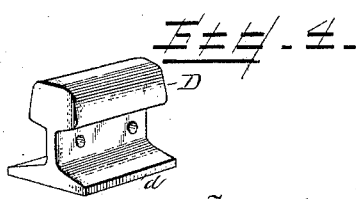
Witnesses
Jos. H. Blackwood.
Albert B. Blackwood
Inventor
Roswell H. St. John
by H. T. Fisher
Attorney

UNITED STATES PATENT OFFICE.

ROSWELL H. ST. JOHN, OF CLEVELAND, OHIO.

RAILWAY-CROSSING.

SPECIFICATION forming part of Letters Patent No. 430,760, dated June 24, 1890.

Application filed February 24, 1890. Serial No. 341,591. (No model.)

*To all whom it may concern:*

Be it known that I, ROSWELL H. ST. JOHN, a citizen of the United States, residing at Cleveland, in the county of Cuyahoga and State of Ohio, have invented certain new and useful Improvements in Railway-Crossings; and I do hereby declare that the following is a full, clear, and exact description of the invention, which will enable others skilled in the art to which it appertains to make and use the same.

My invention relates to improvements in railway-crossings, and is an improvement on my Patent No. 388,929, dated September 4, 1888.

This improvement consists in the manner of securing the rail-sections to the corner-posts, whereby the said sections each are prevented from sliding or creeping longitudinally, and are firmly held in their position, as well as being easily placed in position and removed, all substantially as hereinafter described, and particularly pointed out in the claims.

In the accompanying drawings, Figure 1 is a plan view of a railway-crossing constructed, say, substantially in the form shown in my patent above referred to, excepting in the particulars herein described. Fig. 2 is a vertical central section showing one of the corner-posts and the rail-section placed thereon as in operative position. Fig. 3 is a perspective view of one of the corner-posts alone, showing a groove in the head for the base of the rail-section and a central hole for the dowel-pin. Fig. 4 is a perspective view of a rail-section adapted to be secured to said head, and Fig. 5 is a perspective view of one of the plates employed to fasten the rail-section.

A represents a railroad-crossing of the kind to which my improvement is adapted, but is shown here only to illustrate the position and relation of the improved part, and does not in itself otherwise form any part of the invention.

B represents one of the corner-posts in the angle of the crossing. These posts, as in my patent above referred to, have cylindrical shanks $b$ and circular heads $b'$, adapted to set down in the frame of the crossing. These posts B have grooves $c$ cut transversely in the heads a sufficient depth to form a seat for the rail-section D, the said groove having the width and depth substantially of the flanged base $d$ of the said rail-section, so that the said section will fit snugly therein. Centrally of the groove and the post is a hole $e$, and a corresponding hole is made centrally in the rail-section $d$, and a dowel-pin $g$ is placed in these holes and serves to prevent the creeping or sliding of the said rail-section on the head, as hereinbefore referred to. Then, in order that the said rail-section may be properly braced and supported, so as to be firmly fixed upon the post, I employ two plates H, one for each side of the rail and provided with flanges $h$, which bear against the web of the rail, and flat portions $h'$, adapted to be fastened to the posts. Suitable bolts $k$ are employed to fasten the said plates to the web of the rail, the said bolts passing through flanges $h$ and the said web, while screws or other equivalents $k'$ pass through holes in the plate into the head of the posts.

Having thus described my invention, what I claim as new, and desire to secure by Letters Patent, is—

1. A corner-post for the crossing, provided with a groove having straight sides and a hole for a dowel-pin in combination with a rail-section having a flanged base setting in said groove, and flanged plates at the sides of said rail-section to hold it in position, and a dowel-pin to lock said rail-section on said corner-post, substantially as described.

2. A corner-post for a railroad-crossing, having a cylindrical shank and a head with a transverse groove, in combination with a rail-section having a flanged base occupying said groove and side plates to hold the rail fastened through the web of the rail and to the post-head, substantially as described.

Witness my hand to the foregoing specification this 4th day of February, 1890.

ROSWELL H. ST. JOHN.

Witnesses:
H. T. FISHER,
H. L. McLANE.